April 10, 1928.                                       1,666,049
                        G. H. TOZIER
        LOWERING THE VISCOSITY OF NITROCELLULOSE IN
              SOLUTIONS BY MECHANICAL ACTION
                     Filed April 5, 1926
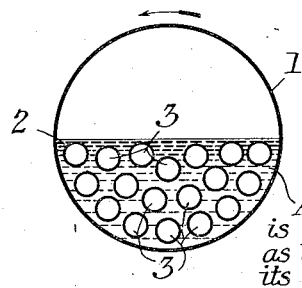
A. Nitrocellulose solution is intensively agitated, such as by a ball mill action, until its viscosity is lowered below 80% of its original value, say until the lowered viscosity is practically constant.
INVENTOR.
George H. Tozier,
BY R. L. Stinchfield
         ATTORNEY Patented Apr. 10, 1928.

1,666,049

UNITED STATES PATENT OFFICE.

GEORGE H. TOZIER, OF ROCHESTER, NEW YORK, ASSIGNOR TO EASTMAN KODAK COMPANY, OF ROCHESTER, NEW YORK, A CORPORATION OF NEW YORK.

LOWERING THE VISCOSITY OF NITROCELLULOSE IN SOLUTIONS BY MECHANICAL ACTION.

Application filed April 5, 1926. Serial No. 99,825.

This invention relates to the reduction of the viscosity of nitrocellulose in solution. One object of the invention is to provide a simple and safe process for reducing the viscosity of nitrocellulose solutions by mechanical action. Another object of the invention is to provide such a process in which the use of artificial heat is unnecessary. Other objects will hereinafter appear.

In the accompanying drawing the single figure shows, upon an exaggerated scale, a diagrammatic view of one form of apparatus in which my process may be carried out.

It is desirable to produce concentrated solutions of nitrocellulose of low viscosity When concentrated solutions are prepared of the nitrocelluloses which are ordinarily available, said solutions are extremely viscous and various means have been proposed for treating the nitrocellulose either before or after it has been brought into solution in order to lower its viscosity characteristics.

I have discovered that the viscosity characteristics of nitrocellulose may be lowered in a safe and simple manner by dissolving it in a liquid solvent to form a viscous solution and then subjecting said solution to sufficiently prolonged intensive mechanical agitation. In the preferred form of my invention the mechanical action is carried on until the viscosity of the solution is at least less than 80% of its original viscosity. I have found it particularly useful to prolong the action, say in a ball mill, for example, until the lowered viscosity becames practically constant. At this point further mechanical action would be a needless expense.

I shall describe one way of carrying out my invention by way of example, but it will be understood that my invention is not limited to the details thus given, except as indicated in the appended claims. 300 grams of nitrocellulose, such as celluloid waste or cleaned photographic film base or scrap are dissolved in 2000 grams of a solvent containing 55% of benzol, 24% of ethyl acetate and 21% of denatured alcohol. This is charged into a one-gallon ball mill using flint balls of approximately ¾" diameter. This is rotated at a speed of 20 to 30 R. P. M. until the desired results are produced.

I have found that with some nitrocelluloses under the above described conditions the viscosity of the solution will drop off more than 20% in four days, but this will vary with the conditions of working. I have also found that the lowered viscosity finally becomes practically constant. Under the conditions illustrated above, I have with certain nitrocelluloses obtained practically constant viscosity in eleven days of treatment. During this treatment the viscosity dropped to approximately one-half of its original value. Where the viscosity characteristics of the nitrocellulose are originally high, a 50% reduction does not, of course, render the solutions fit for spraying, although it makes them more easy to spread. But my process offers a simple and safe (operating at room temperature) method of causing a large initial lowering of viscosity which can then be supplemented by further viscosity-lowering methods, such as treatment with acids.

Having thus described my invention, what I claim as new and desire to secure by Letters Patent is:

1. The process of lowering the viscosity characteristics of nitrocellulose which comprises forming a viscous solution of it in a liquid solvent, and subjecting said solution to intensive mechanical agitation until the viscosity of said solution is lowered to less than 80% of its original viscosity.

2. The process of lowering the viscosity characteristics of nitrocellulose which comprises forming a viscous solution of it in a liquid solvent, and subjecting said solution to the action of rubbing and stirring forces until the lowered viscosity of the solution becomes practically constant.

Signed at Rochester, New York, this 20th day of March, 1926.

GEORGE H. TOZIER.